United States Patent [19]

Hostetler

[11] Patent Number: 4,491,088
[45] Date of Patent: * Jan. 1, 1985

[54] WATERING SYSTEM FOR FOWL AND SMALL ANIMALS

[75] Inventor: Eldon Hostetler, Middlebury, Ind.

[73] Assignee: Ziggity Systems, Inc., Middlebury, Ind.

[*] Notice: The portion of the term of this patent subsequent to Aug. 18, 1998 has been disclaimed.

[21] Appl. No.: 520,099

[22] Filed: Apr. 10, 1981

Related U.S. Application Data

[63] Continuation of Ser. No. 113,607, Jan. 21, 1980, Pat. No. 4,284,036.

[51] Int. Cl.³ .................................................. A01K 7/00
[52] U.S. Cl. ...................................................... 119/72.5
[58] Field of Search ........................... 119/72.5, 75, 71

[56] References Cited

U.S. PATENT DOCUMENTS

| 241,884 | 5/1881 | Robinson | 119/75 |
| 1,310,320 | 7/1919 | Bodgd | 119/75 |
| 3,385,267 | 5/1968 | Boegli | 119/72.5 |
| 3,416,499 | 12/1968 | Wilmott | 119/72.5 |
| 3,566,844 | 3/1971 | Occhiodori | 119/72.5 |
| 3,602,197 | 8/1971 | Fioretto | 119/72.5 |
| 3,716,030 | 2/1973 | Godshalk | 119/72.5 |
| 3,756,199 | 9/1973 | Clark | 119/72.5 |
| 3,838,664 | 10/1974 | Atchley | 119/72.5 |

Primary Examiner—Jay N. Eskovitz
Attorney, Agent, or Firm—Eugene C. Knoblock

[57] ABSTRACT

A valved discharge member for use with the water supply system for use with cages of fowl and small animals, wherein a valve element in the member engages two spaced valve seats and is unseated by movement laterally and upwardly of a pin extending through a discharge opening and projecting below the housing.

2 Claims, 4 Drawing Figures

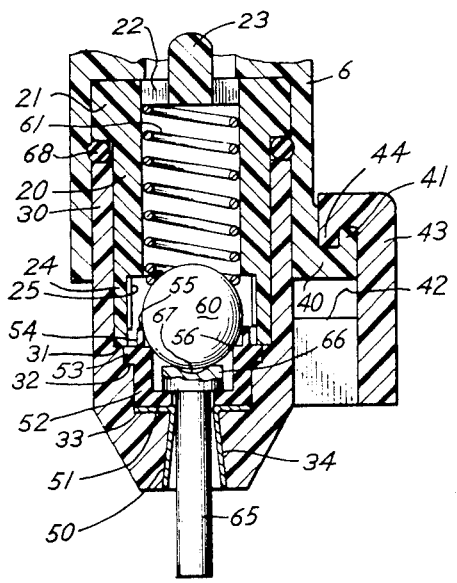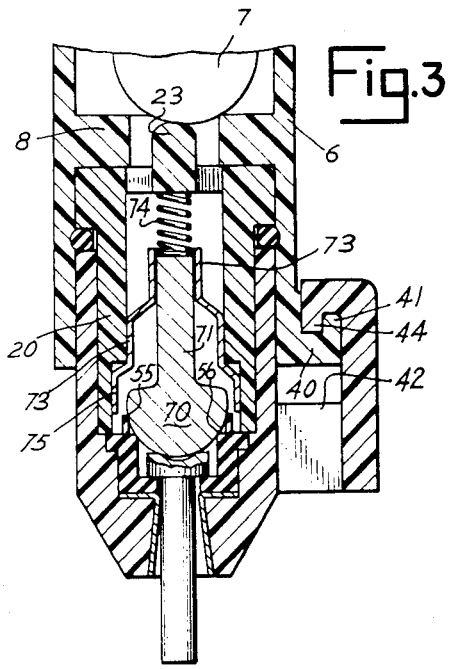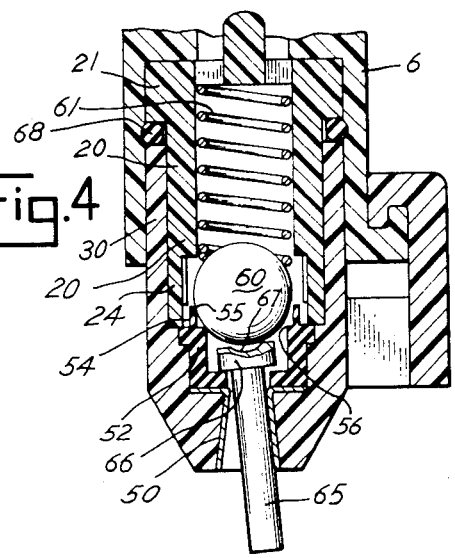

WATERING SYSTEM FOR FOWL AND SMALL ANIMALS

This application is a continuation of Ser. No. 113,607, filed Jan. 21, 1980, now U.S. Pat. No. 4,284,036, dated Aug. 18, 1981.

SUMMARY OF THE INVENTION

This invention relates to a watering system for fowl and small animals and particulary to the watering system for use in connection with and accessible at the various cages or compartments in which fowl and small animals are reared, and/or cages in which hens and other fowl are retained so that eggs produced by them may be retained and collected.

Prior constructions of valve units of watering systems of this general type intended for providing fresh water have entailed or utilized constructions in which a housing of vertical tubular character, usually provided with a valve, is clamped or secured to a horizontal supply conduit at an opening through which water from the conduit may be discharged. The constructions of the valves of prior devices have utilized plastic bodies and metal parts, such as valve members, which parts have commonly been formed by usual machining methods but have been subject to the formation of ribs or projections thereon which, in repeated use for a period of time have caused wear of the plastic body, as by a sawing action. Progressive wear progressively increases the rate of flow liquid which is discharged incident to any given operation of the valve member, and the flow rate can become excessive and cause discharge of water in an amount in excess of the amount which the fowl or animal, and particularly a small chicken, can ingest. Also, the discharge of an excess amount of water incident to a given opening actuation of the valve can cause wetting of the fowl or animal within the cage and wetting of the fowl or animal within the cage and wetting of the litter within the cage with the result that the health of the occupant is endangered. This and other characteristics of prior devices have detracted from successful use and have required either frequency replacement of the watering device or removal thereof.

The present device is designed and constructed to eliminate the aforementioned and other deficiencies of prior devices and has for its principal object the successful elimination of the aforementioned and other limitations and disadvantages.

A further object is to provide a water discharge unit of this type which effectively meters the amount of liquid discharged and which maintains substantially constant the rate of discharge of water therethrough incident to each operation of the device to a given extent.

A further object of this invention is to provide a device of this character which provides multiple spaced valve seats engageable by a valve element to insure effective normal sealing of the valve element.

A further object is to provide a device of this character wherein a flexible valve seat forming member is engaged by a valve element having a spherical surface and is subjct to deflection to provide continuous annular sealing engagement with a valve element, including engagement at irregularities in the surface of the valve element.

A further object is to provide a water distributor having an actuator projecting therefrom at a water discharge opening and operable to unseat a valve in response to lateral tilting in any direction and to upward bodily movement.

Other objects will be apparent from the following specification.

BRIEF DESCRIPTION OF THE DRAWINGS

FIG. 2 is an axial sectional view of one embodiment of a distributor in sealed position.

FIG. 3 is an axial sectional view of another embodiment of the invention in its sealed position.

FIG. 4 is an axial sectional view of the embodiment of the invention illustrated in FIG. 2, shown in a water discharging position.

DESCRIPTION OF THE PREFERRED EMBODIMENT

Figure 1:
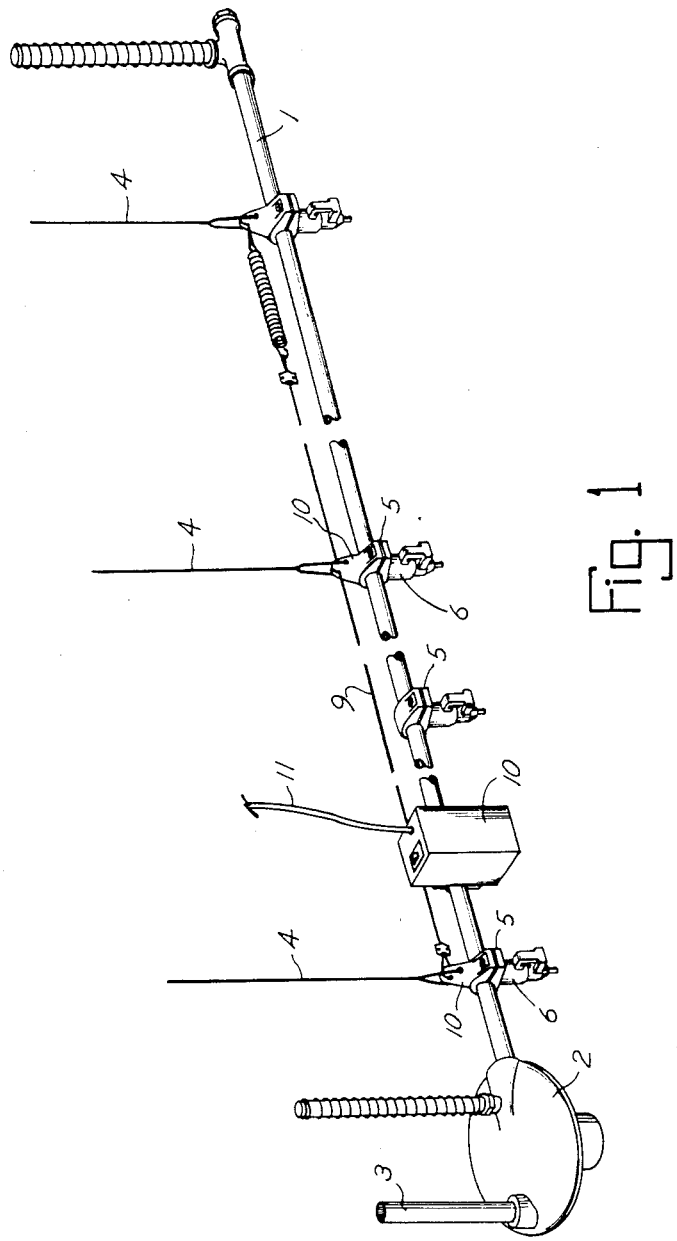
FIG. 1 is a perspective view illustrating a watering system having multiple water distribution parts of the character embodied in this invention.

Referring to the drawings which illustrate preferred embodiments of the invention, the numeral 10 designates a water supply conduit connected with pressure regulating means 2 having connection with a water supply through a line 3. The conduit 1 is positioned to extend through a series of cages, not shown, in which fowl and small animals may be housed. The conduit 1 may be supported at selected elevation and in substantially, horizontal position by any suitable means, such as suspension cables 4 connected to clamps 5, each encircling the conduit 1 at a selected position. Each clamp has a depending tubular discharge 6 communicating with a discharge opening at the lower part of the conduit 1. Clamps 5 may be provided with valves which may be of the normally closed type, but which are opened upon connection of a water distributor thereto. Thus, the clamp may include a valve element 7 normally seating on a valve seat 8, but displaced from the valve seat, as shown in FIG. 3, in the assembled position of the parts. The clamp may be of the type illustrated in my co-pending application Ser. No. 034,243, filed Apr. 30, 1979 for Watering Cup For Poultry and Animals.

If desired, an electrically conductive cable 9 may be suitably mounted in spaced relation above the conduit 1, as by supports 10 projecting above the clamp 5. The cable may be energized by a suitable electrical component 10 connected by a line 11 leading to an electric outlet. The downward tubular discharge 6 of the clamp may include a hook portion at its lower end to accommodate and position a water discharge unit, such as the water discharge unit shown in FIGS. 2, 3, and 4 which fits within the depending tubular discharge 6.

My novel water distributing unit or discharge adapted to be mounted at each clamp 5 is preferably of the character illustrated in FIGS. 2, 3, and 4. Each unit includes an upper tubular member 20 having an upper annular flange portion 21 which has a snug sliding fit within the bore of the clamp discharge tube 6. Tube member 20 has an upper end wall extending thereacross within which are formed a plurality of apertures 22 and from which projects upwardly at its center a valve unseating pin 23 which is adapted to engage the valve 7 of the clamp outlet as illustrated in FIG. 3 when the discharge unit is operatively connected to a clamp 5. The bore of the tubular member 20 is enlarged at its lower end to provide a reduced thickness tube wall portion 24 which is preferably characterized by shallow longitudinal internally projecting ribs 25.

The discharge unit includes a lower tubular member 30 having a snug sliding fit upon the upper tubular member 20 below the upper flange 21 and which fits in the tubular portion 6 of a clamp. Member 30 has a bore which is of stepped configuration to provide an inner annular shoulder 31 adapted to engage the lower end of the tube member 20, a second internal shoulder 32 spaced slightly below the shoulder 31, and a third or lower shoulder 33. The lower portion of the tubular member 30 preferably has a frusto conical bore 34 which is of larger diameter at its lower open end than at its upper end at the shoulder 33.

The clamp 5 with its tubular discharge 6 and the tubular members 20 and 30 are preferably formed of plastic material so as to accommodate the formation thereon of interlocking means to hold the parts 6, 20 and 30 together in operative position when assembled. Thus, the tubular discharge member 6 may have molded integrally therewith at its lower end a laterally projecting hook member 40 terminating in an upwardly projecting flange 41, which hook 40-41 is of limited circumferential dimension. The lower tubular member 30 may have molded integrally therewith at a selected position therein a lateral projection 42 of limited circumferential extend from which projects upwardly the shank 43 of a hook having a downturned flange 44. The hook 43-44 is spaced from the outer surface of the tube 30 a distance to accommodate passage of the clamp tube 6 around the assembled tubes 20, 30 when the hook 40-41 is disaligned from the hook 43-44, to effect the telescoping connection of the parts to the position shown in FIG. 3. When the telescoping connection of the parts is completed, the lower tubular member 30 can be rotated on tube part 6 to cause the hook 43-44 thereof to engage and interlock with the hook 40-41 of the tube 6.

The lower bore 34 of the tube 30 is preferably lined by a metal tapered tubular part 50 having its small diameter end uppermost. From the upper end of liner 50 projects outwardly substantially flat annular flange 51 which bears upon and is supported at the shoulder 33 of tube 30.

A cup shaped member 52, preferably formed of resilient material, such as rubber, is mounted within the bore of the member 30 with its bottom seating against the metal flange 51. The bottom of member 52 has a central aperture of ubstantially the same size as the diameter of the bore at the reduced upper end of the metal liner tube 50 and registers with liner tube 50. The resilient cup shaped member 52 has an enlarged annular upper flange 53 which seats upon the intermediate annular shoulder 32 of the tubular member 30. The upper edge of flange 53 is preferably engaged by the lower end of the tubular member 20 in the assembled relation of the parts. At its upper end the cup shaped member 52 is provided with a thin annular concentric upwardly projecting flange 54 whose outer diameter is less than the diameter of the upper flange 53 thereof and less than the inner diameter of the lower portion 24 of the tubular member 20. The inner diameter of the flange 54 is greater than the inner diameter of the cup member. This arrangement provides two annular valve seats. The upper valve seat 55 is formed by the upper lip or margin of the flange 54 of part 52. The lower valve seat 56 is provided by the shoulder at the upper inner edge of the wall of the cup member 52.

In the constructions illustrated in FIGS. 2 and 4, a valve member 60 in the nature of a metal ball is received within the lower enlarged bore of the portion 24 of the tubular member 20. The diameter of the ball or sphere 60 is slightly greater than the diameter of the upper valve seat 55. The spherical valve 60 may be urged downwardly by a coil spring 61 within the bore of tube 20 whose upper end bears against the apertured upper end wall of the member 20 and whose lower end bears upon the valve member 60. The pressure exerted by the spring will preferably be just sufficient to insure continuous sealing circumferential contact of the valve element 60 with the cup shaped rubber member 52 at both of the valve seats 55 and 56. The annular flange 54 of the cup shaped member 52 will be thin to accommodate flexing and stretching thereof for continuous circumferential sealing engagement of the ball 60 at the upper valve seat 55 when continuous circumferential contact of the ball valve 60 at the lower valve seat 56 occurs. At the same time the pressure exerted by the spring 61 is preferably small so that the force required to unseat the valve member 60 may be maintained at a minimum.

Within the metal liner 50 at the lower portion of the bore of the member 30 is positioned an elongated pin 65 preferably formed of metal and of a diameter slightly less than the smallest diameter of the bore of the liner tube 50 and smaller than the aperture in the bottom wall of the rubber cup shaped member 52. Pin 65 is provided with an enlarged head 66 at its upper end which head preferably includes a recessed upper central surface portion 67. The head 66 bears upon the upper surface of the bottom wall of the cup shaped member 52 and is of such size and shape that its upper surface is adjacent to but slightly spaced from the lowermost portion of the valve sphere 60, as seen in FIG. 2, in the normal position of the parts. The pin head 66 is of such dimension, however, that upon lateral pivoting of the pin, as illustrated in FIG. 4, the head 66 will slightly unseat the valve 60 from the valve seats 55 and 56 to accommodate the flow of liquid therepast metered according to the angle of lateral pivot of the pin.

An effective seal of the discharge assembly within the clamp tube 6 is provided by proportioning of the lengths of the parts 20 and 30 to provide an annular groove between the upper end of the tubular member 30 and the lower portion of the flange 21 of the member 20 which can receive an O-ring or other annular seal 68 insuring against leakage of liquid through the clamp tube 6 and around the parts 20 and 30.

A modified embodiment of the invention is shown in FIG. 3 wherein a valve member 70, of part-spherical configuration bearing upon the valve seats 55 and 56 as previously described, is provided with an elongated upwardly projecting valve stem 71. The valve stem 71 has a clearance sliding fit within a tubular guide member 72 positioned above and supported by a mounting tube 73 having a snug fit within the bore of the tube 20. A coil spring 74 presses downwardly on the valve stem 71 to urge the valve 70 into engagement with the valve seats. The lower end 75 of the mounting tube 73 includes an outwardly flaring lower end portion to anchor the guide and maintain spacing of the guide from the valve member for flow of water therearound.

When the watering system is assembled with a discharge device connected at each clamp 5 and the water supply at line 3 connected to a water supply source, the discharge outlet at each discharge device is effectively sealed by the valve 60 or 70 thereof. Liquid flow into each discharge device is assured by virtue of the opening of valve elements 7 by the members 23 incident to assembly of the discharge devices to tubes 6 of the clamps 5. Leakage past a valve 60 or 70 is effectively prevented by: (a) the engagement of the ball valve 60 or 70 with part 54 to cause outward deflection of the part 54 which forms the upper valve seat 55 until (b) the ball 60 or 70 is in effective engagement with the lower valve seat 56. The spring pressure applied by the coil spring 61 is sufficient to insure the continuous peripheral seal of the ball valve at the valve seats 55 and 56. Similarly in the FIG. 3 embodiment, sufficient pressure is exerted by the spring 74 upon the stem 73 of valve 70 to cause the part-spherical valve head 70 to seat effectively at the upper and lower valve seats 55 and 56. Leakage of the parts at the interfit of the discharge assembly in the clamp tube 6 is effectively prevented by the O-ring seal 68.

With respect to the FIG. 3 embodiment, it will also be noted that the clearance fit of the valve stem 71 in the guide tube 73 is sufficient to permit flow around the stem and into the chamber in which the valve head 70 is received.

The seals at the valve seats 55 and 56 and at the O-ring 68 effectively insure that no leakage will occur at a discharge device which would endanger the poultry or animals in the compartment in which the discharge device is located. Such leakage, if it did occur, would wet the litter in the enclosure and might wet the fowl and thus endanger the health of the fowl or animal. This is particularly important in connection with watering systems for cages or compartments receiving small chickens.

The effectiveness of the seal against leakage provided by the double valve seat arrangement 55, 56 and by the flexibility of the part 54, and the spring pressure exerted against the valve element does not materially detract from the sensitivity of the device in operation to discharge water as required by the fowl or animal occupying the cage or compartment within which the water discharge device is located. In this connection the pin 65 is of a length to project below the lower end of the housing part 30 and it is sufficiently loose within the housing to accommodate movement at its lower end in any direction laterally and to accommodate upward movement thereof. Lateral movement of the lower end of the pin 65 in any direction results in a fulcrum action of the head 66 of the pin upon the base of the cup member 52 and elevation of the portion of the head 66 of the pin opposite the fulcrum sufficient to raise to a slight extent the portion of the valve element 60 or 70 away from portions of the valve seats 55 and 56 and thus to permit the flow of a small quantity of liquid therepast and through the outlet opening 34 around the pin 65. Small chicks and other small fowl and small animals quickly learn to shift the pin 65 laterally in this manner when they desire drinking water. As the fowl and animals grow, they also learn that endwise upward movement of a pin 65 will displace the valve and accommodate a limited flow of water for drinking purposes.

The formation of the housing parts 20 and 30 from a plastic material avoids problems of rust thereof. The pin 65, valve elements 60 and 70, springs, and guides 73 may be formed of non-rusting metal, such as stainless steel. Thus clogging of the device due to the formation of rust is effectively precluded. These characteristics of the device avoid the requirement for frequent replacement of watering devices which has been experienced commonly in prior constructions.

While the use of coil springs such as 61 and 74 may be preferred, such springs are not essential in all cases, particularly where the valving element, such as 60 or 70, is of sufficient weight to normally insure an effective double seal thereof at the dual annular valve seats 55,56.

The construction illustrated in FIG. 3, which limits the flow of water to the valve 70 to the extent of the clearance of the valve stem 71 within the tubular guide 72, serves as a means for metering the rate of flow. A clearance at this point in the order of a difference of 0.007 inches in the outer diameter of the valve stem and the inner diameter of the valve guide 72 is sufficient for normal usage of the system with poultry cages. In this regard is has been found that a difference or clearance of 0.001 inches in a liquid flow passage of this construction can increase the rate of flow in the order of 25 percent. Effective metering of the rate of flow is important to insure against excessive discharge of water. At the same time the manner of actuation of the device also can serve as a control of the rate of flow, that is, only a partial lateral tilting of the pin 65 will permit less flow than maximum permissible tilting thereof is illustrated in FIG. 4. Likewise, the rate of flow can be varied by the extent to which a direct upward movement of the pin 65 occurs.

An important consideration of the device is that the factors of water pressure, spring pressure, and the weight of the valve element tend to provide an effective continuous seal 80 to the valve seats 55 and 56 and may also provide a continuous circumferential seal between the pin head 66 the bottom wall of the cup shaped member 52 against which head 66 seats, particularly in cases where the thickness of the head 66 is such that it substantially spans the clearance space between the bottom of the valve element and the bottom of the cup as illustrated in FIGS. 2 and 3.

The quick disconnect provided by the inter-engaging hooks 41, 44 effectively holds the device in assembled position. It also accommodates release and removal of the distributing unit from the water line upon rotation of the member 30 relative to the clamp tube 6. This is important because it provides ready adaptability and versatility in different types of installations, as to accommodate interchange of discharge devices of different constructions, such as constructions which include a drinking cup as illustrated in my co-pending application Ser. No. 034,243, filed Apr. 30, 1979, when a distributor of the type shown is removed.

While the preferred embodiment of the invention has been illustrated and described, it will be understood that changes in the construction may be made within the scope of the appended claims without departing from the spirit of the invention.

What I claim is:

1. A valve for watering fowl and animals, comprising a housing having an inlet and an outlet, an annular member in said housing defining three concentric valve seats in spaced substantially parallel planes, a valve element having a surface portion normally seating against two of said valve seats, and an actuating pin extending through said outlet with clearance and projecting from said housing, said pin having an enlarged head normally seating on the third said valve seat, said valve element and said head normally engaging said respective valve seats of said annular member whereby said ball and head provide three seals, said head being of a size and being positioned adjacent said valve element whereby slight movement of the projecting part of said actuating pin shifts said head from seated position on said third valve seat and shifts said valve element relative to said valve seats to initiate liquid flow from said inlet to said outlet.

2. A valve for watering fowl and animals, comprising a housing having an inlet and an outlet, said housing including telescopically interfitting parts defining an annular seal-receiving chamber, a sealing ring within said annular chamber, said telescopically interfitting parts having complementary external hooks adapted to interlock when said housing parts are in selected relative rotative telescoped position and to disengage in other relative rotative positions, a member in said housing defining a plurality of valve seats, a valve element normally in sealing engagement with at least one valve seat of said valve seat member, and an actuating pin extending with clearance through said outlet and projecting therefrom, said pin having a head positioned in said housing and abutting and normally engaging another valve seat of said valve element and positioned adjacent said valve element whereby movement of said actuator relative to said valve seat shifts said valve element to accommodate liquid flow from said inlet to said outlet past said valve element and the head of said pin.

* * * * *

UNITED STATES PATENT AND TRADEMARK OFFICE
CERTIFICATE OF CORRECTION

PATENT NO. : B1 4,491,088

DATED : March 31, 1987

INVENTOR(S) : Eldon Hostetler

It is certified that error appears in the above-identified patent and that said Letters Patent is hereby corrected as shown below:

In Section [56], please insert --

OTHER PUBLICATIONS

Ziggity Systems, Inc. E-Z Sip Drinker Advertisement--

Signed and Sealed this

Seventeenth Day of November, 1987

Attest:

DONALD J. QUIGG

*Attesting Officer*   *Commissioner of Patents and Trademarks*

REEXAMINATION CERTIFICATE (660th)

United States Patent [19]

Hostetler

[11] B1 4,491,088

[45] Certificate Issued * Mar. 31, 1987

[54] WATERING SYSTEM FOR FOWL AND SMALL ANIMALS

[75] Inventor: Eldon Hostetler, Middlebury, Ind.

[73] Assignee: Ziggity Systems, Inc., Middlebury, Ind.

Reexamination Request:
No. 90/000,760, Apr. 16, 1985

Reexamination Certificate for:
Patent No.: 4,491,088
Issued: Jan. 1, 1985
Appl. No.: 520,099
Filed: Apr. 10, 1981

[*] Notice: The portion of the term of this patent subsequent to Aug. 18, 1998 has been disclaimed.

Related U.S. Application Data

[63] Continuation of Ser. No. 113,607, Jan. 21, 1980, Pat. No. 4,284,036.

[51] Int. Cl.⁴ .............................................. A01K 7/06
[52] U.S. Cl. .................................................. 119/72.5
[58] Field of Search .......................... 119/71, 72.5, 75

[56] References Cited

U.S. PATENT DOCUMENTS

| | | |
|---|---|---|
| 923,611 | 6/1909 | Werd . |
| 1,168,933 | 1/1916 | Burkley et al. . |
| 1,249,090 | 12/1917 | Hoff . |
| 1,331,720 | 2/1920 | Paterson . |
| 1,345,496 | 7/1920 | Keeler . |
| 1,916,513 | 7/1933 | Jones . |
| 2,044,629 | 6/1936 | Parker . |
| 2,252,924 | 8/1941 | Hale . |
| 2,307,220 | 1/1943 | Hewitt . |
| 2,575,906 | 11/1951 | Bullard . |
| 2,591,514 | 4/1952 | Courtot . |
| 2,664,255 | 1/1948 | Johnson . |
| 2,676,782 | 4/1954 | Bostock et al. . |
| 2,678,630 | 5/1954 | Frederiksen . |
| 2,851,007 | 9/1958 | Kagan . |
| 2,884,944 | 5/1959 | Giles . |
| 3,010,435 | 11/1961 | Abrams . |
| 3,077,896 | 2/1963 | Weingard . |
| 3,217,746 | 11/1965 | Voisine . |
| 3,431,891 | 3/1969 | Boegli et al. . |
| 3,483,847 | 12/1969 | Kneubuehl . |
| 3,513,811 | 5/1970 | Graham . |
| 3,529,575 | 9/1970 | Schalk . |
| 3,550,560 | 12/1970 | Edstrom . |
| 3,602,197 | 8/1971 | Fioretto . |
| 3,620,653 | 11/1971 | Gaylord . |
| 3,664,305 | 5/1972 | Hart et al. . |
| 3,669,077 | 6/1972 | Spierenburg . |
| 3,698,431 | 10/1972 | Thompson . |
| 3,716,030 | 2/1973 | Godshalk . |
| 3,750,628 | 8/1973 | Schumacher . |
| 3,756,199 | 9/1973 | Clark . |
| 3,887,165 | 6/1975 | Thompson . |
| 4,185,590 | 1/1980 | Hostetler . |
| 4,221,188 | 9/1980 | Hostetler . |
| 4,244,398 | 1/1981 | Tengan . |

FOREIGN PATENT DOCUMENTS

| | | |
|---|---|---|
| 213203 | 3/1940 | Fed. Rep. of Germany . |
| 213395 | 3/1940 | Fed. Rep. of Germany . |
| 213396 | 3/1940 | Fed. Rep. of Germany . |
| 720130 | 4/1942 | Fed. Rep. of Germany . |
| 738513 | 8/1943 | Fed. Rep. of Germany . |
| 902329 | 1/1954 | Fed. Rep. of Germany . |
| 2320012 | 11/1973 | Fed. Rep. of Germany . |
| 877679 | 12/1941 | France . |
| 877680 | 12/1941 | France . |
| 2005311 | 12/1969 | France . |
| 225113 | 4/1943 | Switzerland . |

*Primary Examiner*—Paul J. Hirsch
*Attorney, Agent, or Firm*—Barnes & Thornburg

[57] ABSTRACT

A valved discharge member for use with the water supply system for use with cages of fowl and small animals, wherein a valve element in the member engages two spaced valve seats and is unseated by movement laterally and upwardly of a pin extending through a discharge opening and projecting below the housing.

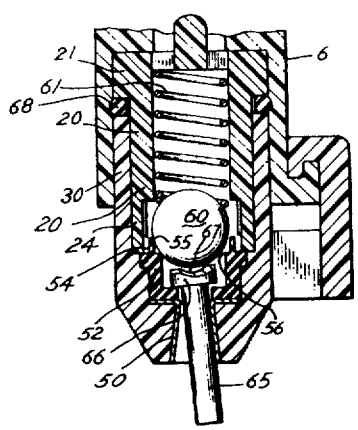

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 17–44:

Prior constructions of valve units of watering systems of this general type intended for providing fresh water have entailed or utilized constructions in which a housing of vertical tubular character, usually provided with a valve, is clamped or secured to a horizontal supply conduit at an opening through which water from the conduit may be discharged. The constructions of the valves of prior devices have utilized plastic bodies and metal parts, such as valve members, which parts have commonly been formed by usual machining methods but have been subject to the formation of ribs or projections thereon which, in repeated use for a period of time have caused wear of the plastic body, as by a sawing action. Progressive wear progressively increases the rate of flow liquid which is discharged incident to any given operation of the valve member, and the flow rate can become excessive and cause discharge of water in an amount in excess of the amount which the fowl or animal, and particularly a small chicken, can ingest. Also, the discharge of an excess amount of water incident to a given opening actuation of the valve can cause wetting of the fowl or animal within the cage [and wetting of the fowl or animal within the cage] and wetting of the litter within the cage with the result that the health of the occupant is endangered. This and other characteristics of prior devices have detracted from successful use and have required either [frequency] *frequent* replacement of the watering device or removal thereof.

Column 2, lines 21–52:

Referring to the drawings which illustrate preferred embodiments of the invention, the numeral [10] *1* designates a water supply conduit connected with pressure regulating means 2 having connection with a water supply through a line 3. The conduit 1 is positioned to extend through a series of cages, not shown, in which fowl and small animals may be housed. The conduit 1 may be supported at selected elevation and in substantially[,] horizontal position by any suitable means, such as suspension cables 4 connected to clamps 5, each encircling the conduit 1 at a selected position. Each clamp has a depending tubular discharge 6 communicating with a discharge opening at the lower part of the conduit 1. Clamps 5 may be provided with valves which may be of the normally closed type, but which are opened upon connection of a water distributor thereto. Thus, the clamp may include a valve element 7 normally seating on a valve seat 8, but displaced from the valve seat, as shown in FIG. 3, in the assembled position of the parts. The clamp may be of the type illustrated in my co-pending application Ser. No. 034,243, filed Apr. 30, 1979 for Watering Cup For Poultry and Animals.

If desired, an electrically conductive cable 9 may be suitably mounted in spaced relation above the conduit 1, as by supports 10 projecting above the [clamp] *clamps* 5. The cable may be energized by a suitable electrical component 10 connected by a line 11 leading to an electric outlet. The downward tubular discharge 6 of the clamp may include a hook portion at its lower end to accommodate and position a water discharge unit, such as the water discharge unit shown in FIGS. 2, 3, and 4 which fits within the depending tubular discharge 6.

Column 3, lines 43–66:

A cup shaped member 52, preferably formed of resilient material, such as rubber, is mounted within the bore of the member 30 with its bottom seating against the metal flange 51. The bottom of member 52 has a central aperture of [ubstantially] *substantially* the same size as the diameter of the bore at the reduced upper end of the metal liner tube 50 and registers with liner tube 50. The resilient cup shaped member 52 has an enlarged annular upper flange 53 which seats upon the intermediate annular shoulder 32 of the tubular member 30. The upper edge of flange 53 is preferably engaged by the lower end of the tubular member 20 in the assembled relation of the parts. At its upper end the cup shaped member 52 is provided with a thin annular concentric upwardly projecting flange 54 whose outer diameter is less than the diameter of the upper flange 53 thereof and less than the inner diameter of the lower portion 24 of the tubular member 20. The inner diameter of the flange 54 is greater than the inner diameter of the cup member. This arrangement provides two annular valve seats. The upper valve seat 55 is formed by the upper lip or margin of the flange 54 of part 52. The lower valve seat 56 is provided by the shoulder at the upper inner edge of the wall of the cup member 52.

Column 5, lines 33–59:

The effectiveness of the seal against leakage provided by the double valve seat arrangement 55, 56 and by the flexibility of the part 54, and the spring pressure exerted against the valve element does not materially detract from the sensitivity of the device in operation to discharge water as required by the fowl or animal occupying the cage or compartment within which the water discharge device is located. In this connection the pin 65 is of a length to project below the lower end of the housing part 30 and it is sufficiently loose within the housing to accommodate movement at its lower end in any direction laterally and to accommodate upward movement thereof. Lateral movement of the lower end of the pin 65 in any direction results in a fulcrum action of the head 66 of the pin upon the base of the cup member 52 and elevation of the portion of the head 66 of the pin opposite the fulcrum sufficient to raise to a slight extent the portion of [the] *a* valve element 60 or 70 away from portions of the valve seats 55 and 56 and thus to permit the flow of a small quantity of liquid therepast and through the outlet opening 34 around the pin 65. Small chicks and other small fowl and small animals quickly learn to shift the pin 65 laterally in this manner when they desire drinking water. As the fowl and animals grow, they also learn that endwise upward movenent of a pin 65 will displace the valve and accommodate a limited flow of water for drinking purposes.

Column 6, lines 26-36:

An important consideration of the device is that the factors of water pressure, spring pressure, and the weight of the valve element tend to provide an effective continuous seal [80] to the valve seats 55 and 56 and may also provide a continuous circumferential seal between the pin head 66 *and* the bottom wall of the cup shaped member 52 against which head 66 seats, particularly in cases where the thickness of the head 66 is such that it substantially spans the clearance space between the bottom of the valve element and the bottom of the cup as illustrated in FIGS. 2 and 3.

AS A RESULT OF REEXAMINATION, IT HAS BEEN DETERMINED THAT:

Claims 1 and 2 are cancelled.

New claims 3-5 are added and determined to be patentable.

3. The valve according to claim 5 wherein said telescopically interfitting parts have only a single set of complementary external hooks, said hooks being of limited circumferential dimension.

4. A valve for watering fowl and small animals, comprising:
 a housing having an inlet and an outlet,
 an annular member in said housing defining three concentric valve seats in spaced, substantially parallel planes,
 a ball valve element having a surface portion normally seating against a first and second of said valve seats,
 an actuating pin extending through said outlet with clearance and projecting from said housing,
 said pin having an enlarged head normally seating on the third of said valve seats,
 said ball valve element and said enlarged head normally engaging said respective valve seats of said annular member whereby said ball valve element and said enlarged head provide three seals,
 said enlarged head being of a size and including a recessed portion having at least a portion of its peripheral edge adjacent and confronting said ball valve element and cooperatively associated therewith during actuation of said ball valve element such that any lateral movement in any direction by the projecting part of said actuating pin causes said enlarged head to shift from its seated position on said third valve seat and causes off-centered leveraged interaction between said ball valve element and said peripheral edge; and
 said off-centered leveraged interaction causing said ball valve element to shift relative to said valve seats to initiate liquid flow from said inlet through said outlet by lifting said ball valve element off of at least part of said first and second valve seats.

5. A valve for watering fowl and animals, comprising:
 a housing having an inlet and an outlet,
 said housing including telescopically interfitting parts defining an annular seal receiving chamber,
 a sealing ring within said annular chamber
 said telescopically interfitting parts having complementary external hooks adapted to interlock when said housing parts are in selected relative rotative telescoped position and to disengage in other relative rotative positions,
 a separate member in said housing defining at least three valve seats,
 a ball valve element normally in sealing engagement with at least a first and second of said valve seats,
 an actuating pin extending with clearance through said outlet and projecting therefrom,
 said actuating pin having a head positioned in said housing and abutting and normally engaging a third of said valve seats,
 said head including a recessed portion having a peripheral edge portion adjacent and confronting said ball valve element and cooperatively associated therewith during actuation of said ball valve element such that any lateral movement in any direction by said actuator pin relative to said third valve seat causes off-centered leveraged interaction between said ball valve element and said peripheral edge portion, and
 said off-centered leveraged interaction causing said ball valve element to accommodate liquid flow from said inlet to said outlet past said ball valve element and said head of said actuating pin by lifting said ball valve element off of at least a portion of said first and second valve seats.

* * * * *